(12) United States Patent
Okada et al.

(10) Patent No.: US 6,958,770 B2
(45) Date of Patent: Oct. 25, 2005

(54) DRIVING ASSISTANCE APPARATUS

(75) Inventors: Tsuyoshi Okada, Yokosuka (JP);
Kazufumi Mizusawa, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 611 days.

(21) Appl. No.: 09/993,727

(22) Filed: Nov. 6, 2001

(65) Prior Publication Data

US 2002/0094110 A1  Jul. 18, 2002

(51) Int. Cl.[7] .............................................. H04N 7/18
(52) U.S. Cl. ...................................... 348/149; 348/148
(58) Field of Search ...................... 348/113, 115–116, 348/119, 149, 148; 340/932.2, 933, 937, 340/939, 943; 701/300–301, 205, 225, 28; 382/104, 106

(56) References Cited

U.S. PATENT DOCUMENTS

| | | | | |
|---|---|---|---|---|
| 5,680,123 A | * | 10/1997 | Lee | 340/937 |
| 5,850,254 A | * | 12/1998 | Takano et al. | 348/148 |
| 6,344,805 B1 | * | 2/2002 | Yasui et al. | 340/932.2 |
| 6,396,535 B1 | * | 5/2002 | Waters | 348/159 |
| 6,654,670 B2 | * | 11/2003 | Kakinami et al. | 701/1 |

FOREIGN PATENT DOCUMENTS

| | | | | |
|---|---|---|---|---|
| EP | 001022903 A2 | * | 7/2000 | H04N 7/18 |
| JP | 58-110334 | | 6/1983 | B60R 1/08 |

* cited by examiner

*Primary Examiner*—Vu Le
(74) *Attorney, Agent, or Firm*—Pearne & Gordon LLP (57) ABSTRACT

A driving assistance apparatus includes: cameras; a plurality of virtual observing point converting unit; an image synthesizing unit for synthesizing image information supplied from this virtual observing point converting unit; an obstacle sensing unit such as an ultrasonic-wave sensor and a millimeter-wave radar; a safety area predicting unit; and a safety area superposing unit. Then, the safety area predicting unit predicts such a safety area where an obstacle is not present based upon both a distance "d1" and an approximate direction, which are obtained from the obstacle sensing unit. Also, the safety area superposing unit superposes the safety area predicted by the safety area predicting unit on an image synthesized by way of cameras to display the synthesized image superposed with the safety area.

8 Claims, 7 Drawing Sheets

FIG. 11A — ACTUAL POSITIONAL RELATIONSHIP

FIG. 11B — SYNTHESIZED IMAGE OUTPUT

DRIVING ASSISTANCE APPARATUS

BACKGROUND OF THE INVENTION

The present invention is related to a driving assistance apparatus operated in such a manner that while images of plural cameras are synthesized with each other so as to achieve a driving assistance purpose, for example, a parking assistance at a parking lot, a condition of an area around a vehicle, containing a dead zone of a vehicle driver, may be easily displayed/guided. More specifically, the present invention is directed to such a driving assistance apparatus capable of displaying such an area by way of safety and easy-understandable display manners in such a manner that while a distance measuring sensor, e.g., an ultrasonic sensor is employed in addition to these cameras, information of this distance measurement is effectively superposed on the synthesized image.

Referring now to drawings, a description will be made of a conventional driving assistance apparatus with respect to background art in this technical field.

Figure 10:
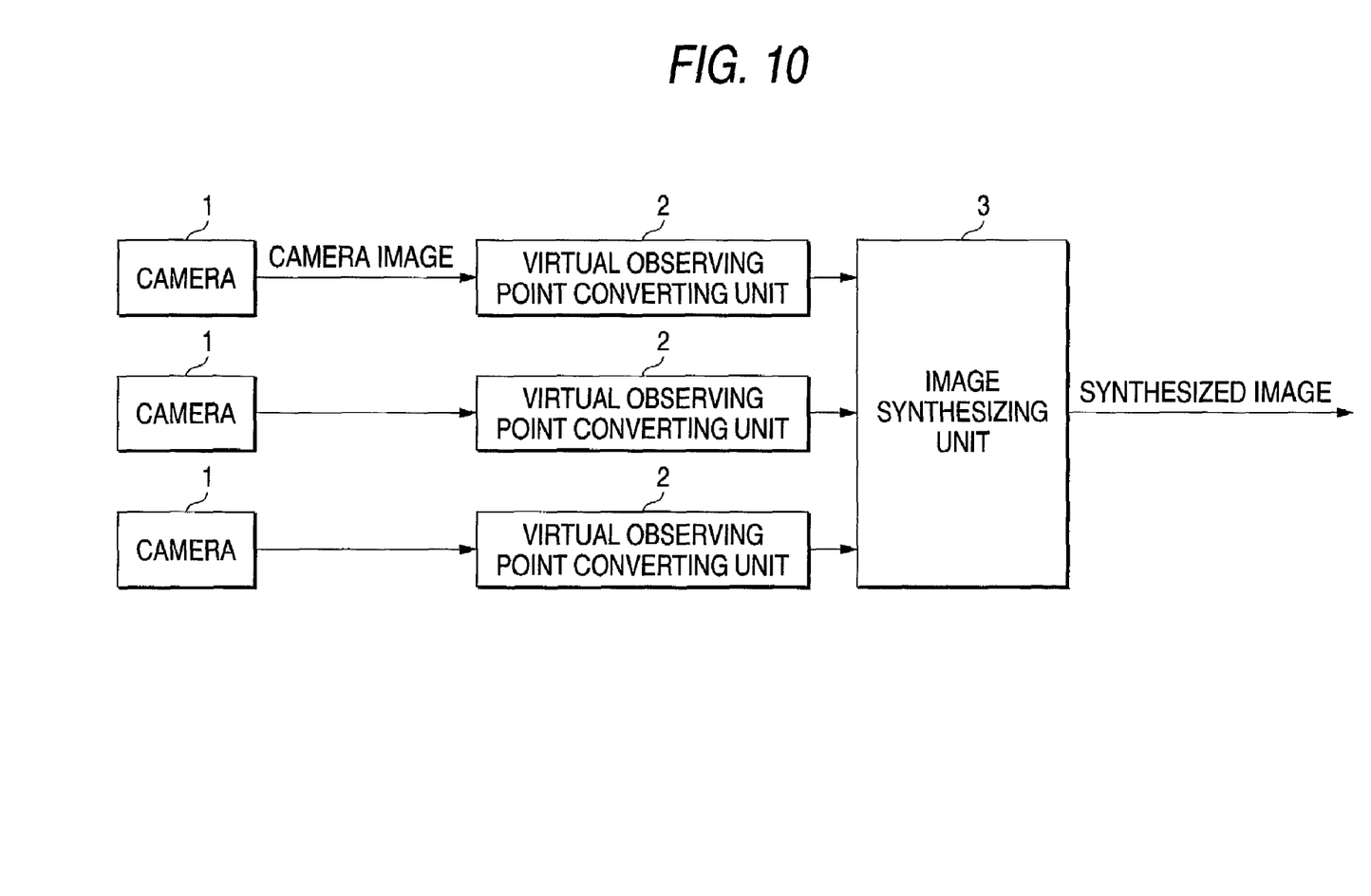
FIG. 10 is a diagram for representing the arrangement of the conventional driving assistance apparatus.

FIG. 10 is a schematic block diagram for representing an arrangement of a conventional driving assistance apparatus. In FIG. 10, the conventional driving assistance apparatus is arrange by a plurality of cameras 1, a plurality of virtual observing point converting unit 2, and an image synthesizing unit 3 for synthesizing image information with each other, which is supplied from this virtual observing point converting unit.

While cameras 1 are mounted on a vehicle, these cameras 1 may pickup, as a moving picture, images regarding a condition of an area around the own vehicle along a certain direction, for example, a forward direction, a backward direction, or a side direction. It should be noted that a total set of camera 1 is not limited to one set, but may be selected to be plural sets. Normally, if images of a peripheral area of a vehicle is wanted to be picked up without any dead zone, then four sets to approximately ten sets of cameras 1 may be mounted on this vehicle.

Normally, an image picked up by the camera 1 corresponds to such an image which can be observed in the case that an observing point is positioned at an image pick-up element of the camera 1. Generally speaking, while an acquired image is subdivided into subdivision images, each of these subdivision images is enlarged, compressed, deformed, and rotated, so that this acquired image may be converted into such an image (moving picture) at an arbitrary observing point as well as an arbitrary observing line from the observing point of the above-explained image pick-up element. For instance, assuming now that the camera 1 is installed in such a manner that an image of a road is picked up from an upper oblique direction in the vicinity of a side mirror of a vehicle, if the observing point of the camera 1 is converted, then the present road image may be converted into such an image which is obtained in such a manner that while the observing point is set to a front edge portion of the vehicle, the observing line is positioned in parallel to the road. Alternatively, the present road image maybe converted into such an image which is obtained in such a manner that while the observing point is positioned at upright of the vehicle, this observing point is directed downwardly.

The virtual observing point converting unit 2 performs the previously-explained virtual observing point converting operations based upon the mounting positions and the mounting attitudes of the respective cameras 1 at predetermined observing points and also at predetermined observing lines (alternatively, predetermined observing points and observing lines may be substituted by such a manner that these observing points/observing lines are later designated by a vehicle driver).

For a better understanding of the technical contents of the conventional driving assistance apparatus, the below-mentioned description is made based upon the following conditions. That is, while an observing point is positioned above a head of the own vehicle, for example, above 10 meters at upright of the own vehicle, a virtual observing point conversion is carried out based upon such an observing line that a vehicle driver observes from this upright position just under the own position.

The image synthesizing unit 3 synthesizes observing-point-converted images with each other, which are acquired from the same observing point by operating the virtual observing point converting unit 2. Assuming now that a plurality of cameras 1 are mounted at a peripheral portion of the vehicle without any dead zone, observing-point-converted images may be synthesized to obtain such an image as if all of the peripheral areas of the own vehicle were observed from the upright position.

Figure 11A:
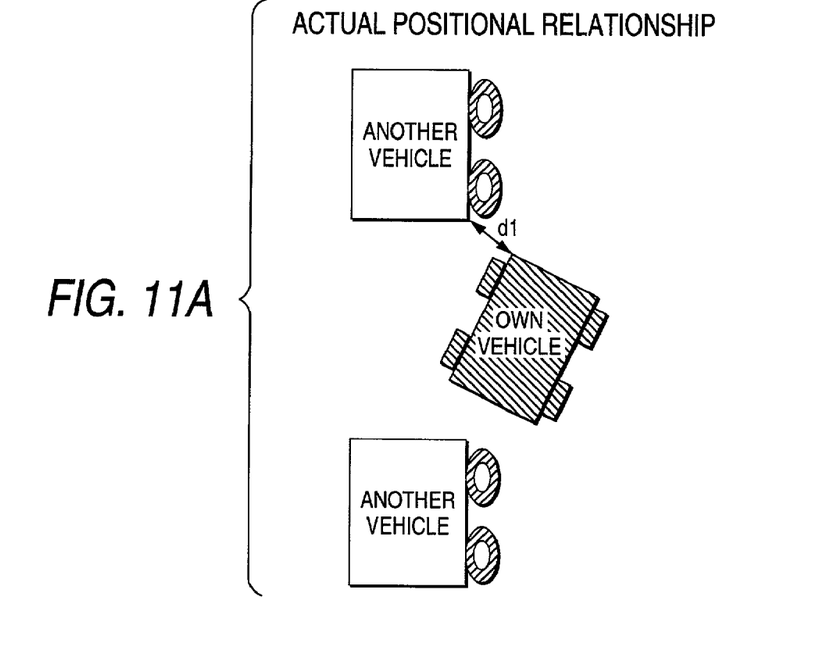
FIGS. 11A and 11B are diagrams for explaining the operation of the conventional driving assistance apparatus.

For instance, such a condition as shown in FIG. 11A is assumed, namely, such a case that the driver of the own vehicle tries to perform parallel parking is predicted. FIG. 11A corresponds to an image which is actually observed from the upright direction of the own vehicle. Also, FIG. 11B corresponds to an image diagram of a synthesized image which maybe obtained from the condition of FIG. 11A by the conventional driving assistance apparatus.

In this case, since the cameras 1 are mounted on the own vehicle, all portions of the own vehicle cannot be completely observed in view of the theoretical point. In other words, it should be understood that the portion of the own vehicle shown in FIG. 11B corresponds to such a model, but is not equal to the actual image. This model is predicted from a previously-measured dimension of the vehicle, and a shape of this vehicle.

Figure 11B:
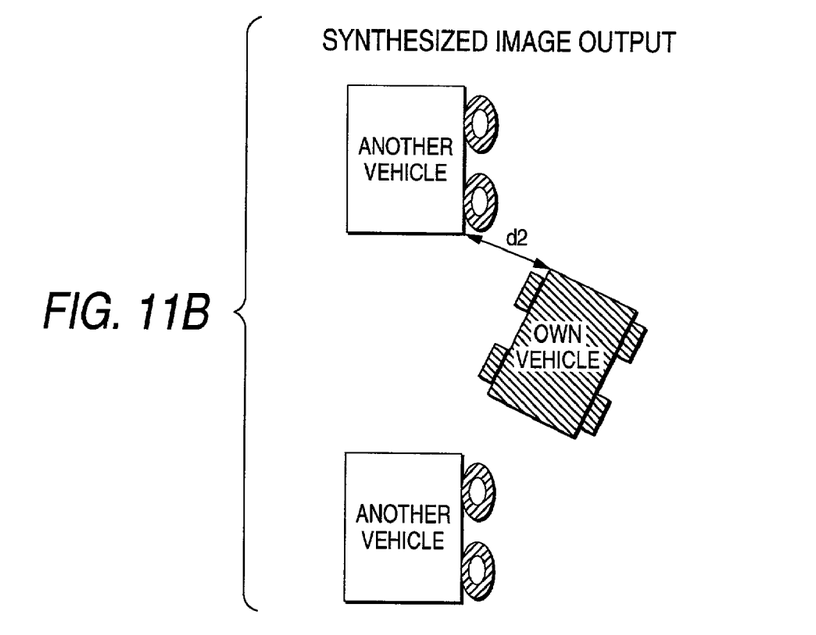

Also, a white lane line drawn on a road surface and a relatively low object are displayed on the synthesized image such as an actually viewed image from the upright position as shown in FIG. 11B, and this synthesized image may constitute a very friendly image for a vehicle driver. However, for example, since the observing points of the adjoining vehicles (three-dimensional objects) are forcibly converted into such images, these image of the adjoining vehicles may be sometimes deformed as actually-not-available images. These converted images are produced in such a manner that images picked up along the transverse direction are forcibly converted into images observed from the upright position.

In FIG. 11B, although the images of other vehicles should be originally observed as the images of FIG. 11A, these vehicle images are observed as follows: These vehicles are pushed by their sides and are largely deformed.

As previously described, while the conventional driving assistance apparatus employs a plurality of cameras which are mounted on the limited places of the vehicle, these images are processed by way of the observing-point conversion and the image synthesizing operation, this conventional driving assistance apparatus may provide to the vehicle driver, such images which could not be so far obtained form the specific observing points, for instance, the image picked up from the upright position of the own vehicle. Thus, the vehicle driver can understand the condition around the own vehicle at a glance.

However, the above-explained conventional driving assistance apparatus owns the following problem. That is, as previously described in the foregoing description of the background art, as to the synthesized image which is provided by the conventional driving assistance apparatus, since the observing points of the adjoining vehicles (obstacles) are forcibly converted into such images, these images of the adjoining vehicles may be sometimes deformed as actually-not-available images. These converted images are produced in such a manner that images picked up along the transverse direction are forcibly converted into images observed from the upright position. As a result, it is practically difficult to grasp the positional relationship between the own vehicle and other vehicles.

For example, in such a case that a vehicle driver only observes this synthesized image when the vehicle driver parks the own vehicle, there are such risks that this vehicle driver mistakenly grasps either a distance or an interval between the own vehicle and other vehicles, so that the own vehicle is made in contact with other vehicles. For instance, as indicated in FIG. 11A, although the own vehicle is approached to another vehicle by the distance "d1" under actual condition, the following phenomenon may occur. That is, as represented in FIG. 11B, the vehicle driver mistakenly observes that the own vehicle is separated from another vehicle by the distance "d2" on the synthesized image.

SUMMARY OF THE INVENTION

The present invention has been made to solve the above-described problems, and therefore, has an object to provide a driving assistance apparatus capable of displaying an area by way of safety and easy-understandable display method in such a manner that while a distance measuring sensor such as an ultrasonic-wave sensor is employed in addition to cameras, this distance measuring information is effectively superposed on a synthesized image.

According to the present invention, in a driving assistance apparatus capable of displaying/guiding a peripheral condition of a vehicle in an easily understanding manner in such a manner that images of plural cameras which are mounted around a peripheral portion of a vehicle are converted way of an observing-point conversion method into images which are produced from a specific virtual observing point and are easily recognizable by a vehicle driver, and also a plurality of the observing-point-converted images are synthesized with each other by an image synthesizing unit so as to display a condition of the peripheral portion of the vehicle, the driving assistance apparatus is comprised of: an obstacle sensing unit for measuring a distance from the own vehicle up to an obstacle and a direction of the obstacle, and also for sensing presence of the obstacle by way of a sensor; and a safety area predicting unit for predicting such a safety area of the peripheral portion of the own vehicle, in which the obstacle is not present, based upon the information acquired by the obstacle sensing unit. As a result, the driving assistance apparatus can make a safety and easy-understandable image display.

Preferably, in the driving assistance apparatus, the driving assistance apparatus is further comprised of: a safety area superposing unit for superposing the safety area on the image synthesized by the image synthesizing unit to thereby display the superposed area. As a result, the driving assistance apparatus can make a safety and easy-understandable image display.

Also, according to the present invention, in a driving assistance apparatus capable of displaying/guiding a peripheral condition of a vehicle in an easily understanding manner in such a manner that images of plural cameras which are mounted around a peripheral portion of a vehicle are converted way of an observing-point conversion method into images which are produced from a specific virtual observing point and are easily recognizable by a vehicle driver, and also a plurality of the observing-point-converted images are synthesized with each other by an image synthesizing unit so as to display a condition of the peripheral portion of the vehicle, the driving assistance apparatus is comprised of: an obstacle sensing unit for measuring a distance from the own vehicle up to an obstacle and a direction of the obstacle, and also for sensing presence of the obstacle by way of a sensor; obstacle area a predicting unit for predicting such an obstacle area in which the obstacle is present based upon the information acquired by the obstacle sensing unit; and an obstacle area superposing unit for superposing the obstacle area on the image synthesized by the image synthesizing unit to thereby display the superposed area. As a result, the driving assistance apparatus can make a safety and easy-understandable image display.

Preferably, in the driving assistance apparatus defined, the obstacle sensing unit corresponds to a distance measuring sensor capable of measuring a distance from the own sensor up to an obstacle, and outputs the shortest distance from the own vehicle among the detected obstacles as the distance up to the obstacle; and the safety area predicting unit predicts as a safety area, such an area detectable by the distance measuring sensor, which is located within either a spherical shape or a circular shape where the distance up to the obstacle is defined as a radius, while a mounting position of the distance measuring sensor is used as a center thereof. As a result, the driving assistance apparatus can make a safety and easy-understandable image display.

Further, in the driving assistance apparatus, the obstacle sensing unit corresponds to an ultrasonic-wave sensor capable of measuring a distance from the own sensor up to an obstacle, and outputs the shortest distance from the own vehicle among the detected obstacles as the distance up to the obstacle; and the obstacle area predicting unit predicts as an area where an obstacle is present, such an area detectable by the ultrasonic-wave sensor, which is located outside either a spherical shape or a circular shape where the distance up to the obstacle is defined as a radius, while a mounting position of the ultrasonic-wave sensor is used as a center thereof. As a result, the driving assistance apparatus can make a safety and easy-understandable image display.

Moreover, in the driving assistance apparatus, the obstacle sensing unit is constituted by either an ultrasonic-wave sensor having a plurality of ultrasonic-wave oscillating sources or an ultrasonic-wave capable of scanning an ultrasonic beam, while varying a direction of the scanning operation; and the obstacle area predicting unit grasps a substantially complete shape of such an obstacle which is faced to a side of the own vehicle based upon the information derived from the obstacle sensing unit, and predicts the area where the obstacle is present, which involving a dimension of the obstacle. As a result, the driving assistance apparatus can make a safety and easy-understandable image display.

Further, in the driving assistance apparatus, the safety area superposing unit superposes the safety area predicted by the safety area predicting unit on the image synthesized by the image synthesizing unit in a flickering display manner, a half-tone dot meshing display manner, or a transparent color display manner. As a result, the driving assistance apparatus can make a safety and easy-understandable image display.

Furthermore, in the driving assistance apparatus, the obstacle area superposing unit superposes the obstacle area predicted by the obstacle area predicting unit on the image synthesized by the image synthesizing unit in a flickering display manner, a half-tone dot meshing display manner, or a transparent color display manner. As a result, the driving assistance apparatus can make a safety and easy-understandable image display.

DETAILED DESCRIPTION OF THE PREFERRED EMBODIMENTS

Referring now to FIG. 1 to FIG. 9, a description will be made of embodiments of the present invention.

(Embodiment 1)

Figure 1:
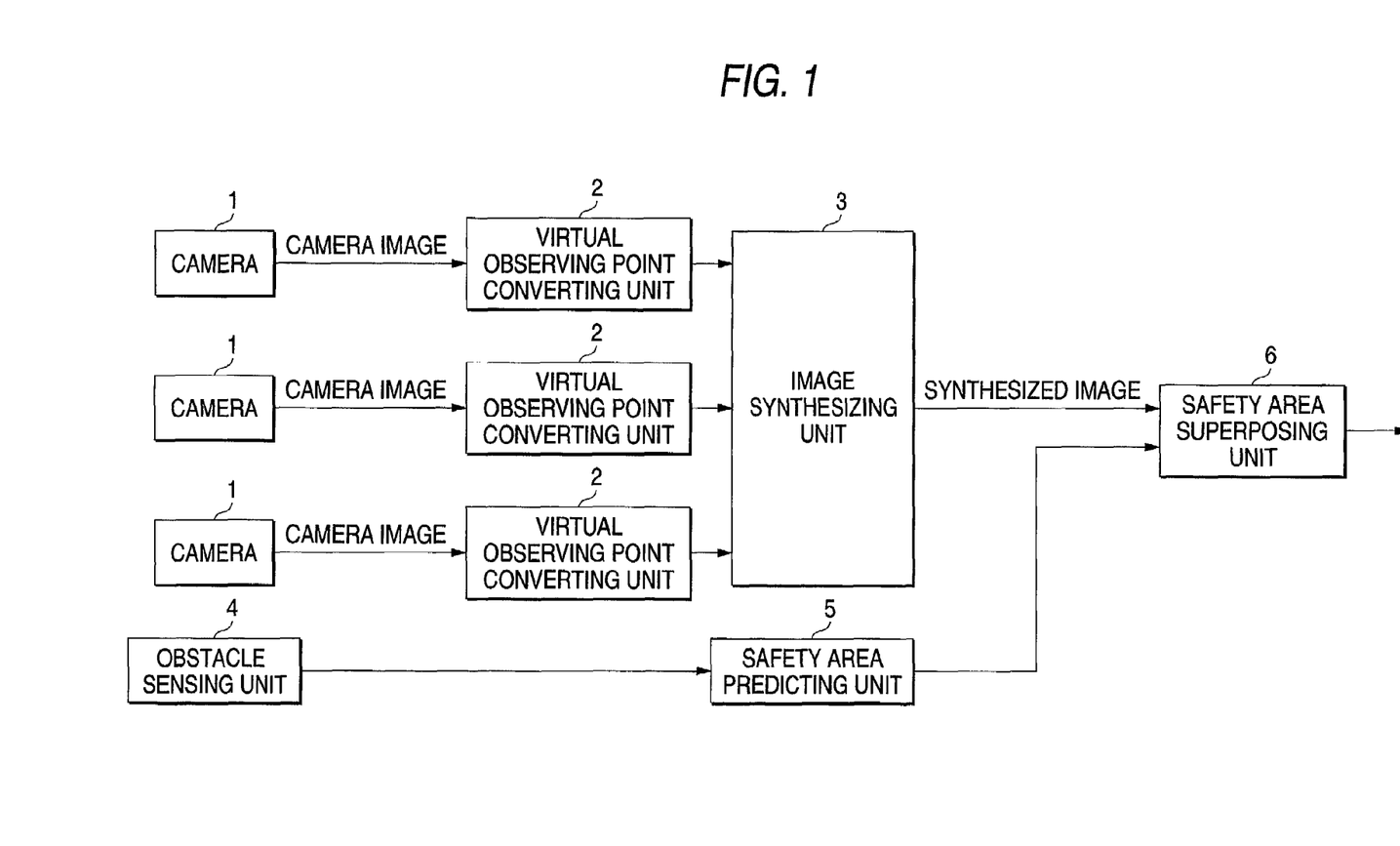
FIG. 1 is a diagram for indicating an arrangement of a driving assistance apparatus according to a first embodiment of the present invention.

FIG. 1 is a schematic block diagram for representing an arrangement of a driving assistance apparatus according to a first embodiment of the present invention. In FIG. 1, this driving assistance apparatus includes a plurality of cameras 1; a plurality of virtual observing point converting unit 2; an image synthesizing unit 3 for synthesizing image information with each other, which is supplied from this virtual observing point converting unit; an obstacle sensing unit 4 such as an ultrasonic-wave sensor and a millimeter-wave radar; and a safety area predicting unit 5; and further, a safety area superposing unit 6.

While the cameras 1 are mounted on a vehicle, these cameras 1 may pick up, as a moving picture, images regarding a condition of an area around the own vehicle along a certain direction, for example, a forward direction, a backward direction, or a side direction. It should be noted that a total set of camera 1 is not limited to one set, but may be selected to be plural sets. Normally, if images of a peripheral area of a vehicle are wanted to be picked up without any dead zone, then four sets to approximately ten sets of cameras 1 may be mounted on this vehicle.

Normally, an image picked up by the camera 1 corresponds to such an image which can be observed in the case that an observing point is positioned at an image pick-up element of the camera 1. Generally speaking, while an acquired image is subdivided into subdivision images, each of these subdivision images is enlarged, compressed, deformed, and rotated, so that this acquired image may be converted into such an image (picture) at an arbitrary observing point as well as an arbitrary observing line from the observing point of the above-explained image pick-up element.

For instance, assuming now that the camera 1 is installed in such a manner that a road is picked up from an upper oblique direction in the vicinity of a side mirror of a vehicle, if the observing point of the camera 1 is converted, then the present road image may be converted into such an image which is obtained in such a manner that while the observing point is set to a front edge portion of the vehicle, the observing line is positioned in parallel to the road. Alternatively, the present road image may be converted into such an image which is obtained in such a manner that while the observing point is positioned at upright of the vehicle, this observing point is directed downwardly.

The virtual observing point converting unit 2 performs the previously-explained virtual observing point converting operations based upon the mounting positions and the mounting attitudes of the respective cameras 1 at predetermined observing points and also at predetermined observing line (alternatively, predetermined observing points and observing lines may be substituted by such a manner that these observing points/observing lines are later designated by a vehicle driver).

For a better understanding of the technical contents of the driving assistance apparatus according to the present invention, the below-mentioned description is made based upon the following conditions. That is, while an observing point is positioned above a head of the own vehicle, for example, above 10 meters at upright of the own vehicle, a virtual observing point conversion is carried out based upon such an observing line that a vehicle driver observes from this upright position just under the own position.

The image synthesizing unit 3 synthesizes observing-point-converted images with each other, which are acquired from the same observing point by operating the virtual observing point converting unit 2. Assuming now that a plurality of cameras 1 are mounted at a peripheral portion of the vehicle without any dead zone, observing-point-converted images may be synthesized to obtain such an image as if all of the peripheral areas of the own vehicle were observed from the upright position.

For instance, such a condition as shown in FIG. 11A is assumed, namely, such a case that the driver of the own vehicle tries to perform parallel parking is predicted. FIG. 11A corresponds to an image which is actually observed from the upright direction of the own vehicle. Also, FIG. 11B corresponds to an image diagram of a synthesized image which maybe obtained from the condition of FIG. 11A by the conventional driving assistance apparatus.

In this case, since the cameras 1 are mounted on the own vehicle, all portions of the own vehicle cannot be completely observed in view of the theoretical point. In other words, it should be understood that the portion of the own vehicle shown in FIG. 11B corresponds to such a model, but is not equal to the actual image. This model is predicted from a previously-measured dimension of the vehicle, and a shape of this vehicle.

Also, a white lane line drawn on a road surface and a relatively low object are displayed on the synthesized image such as an actually viewed image from the upright position as shown in FIG. 11B, and this synthesized image may constitute a very friendly image for a vehicle driver. However, for example, since the observing points of the adjoining vehicles (three-dimensional objects) are forcibly converted into such images, these images of the adjoining vehicles maybe sometimes deformed as actually-not-available images. These converted images are produced in such a manner that images picked up along the transverse direction are forcibly converted into images observed from the upright position.

In FIG. 11B, although the images of other vehicles should be originally observed as the images of FIG. 11B, however, these vehicle images are observed to largely deformed, such that the vehicle is pushed over sideways.

On the other hand, the obstacle sensing unit 4 corresponds to such a distance measuring sensor as an ultrasonic-wave sensor, a millimeter-wave radar, and a laser radar. That is, this distance measuring sensor transmits sound, electromagnetic waves, and the like to an obstacle, and then measures a time duration between the transmission time and the reception time reflected from the obstacle to finally obtain a distance between this sensor and the obstacle. In the case that an actual condition may be represented as in FIG. 11A, and further, the obstacle sensing unit 4 is mounted on a left front edge of the own vehicle, a distance "d1" between a sensor position of the obstacle sensing unit 4 and an obstacle may be measured by the obstacle sensing unit 4. Also, when only one set of a distance sensor such as an ultrasonic-wave sensor is employed, a correct presence direction of an obstacle (another vehicle) cannot be grasped. For example, when two sets of ultrasonic-wave sensors are employed, a presence direction of an obstacle may be roughly conducted from a distance difference between these two ultrasonic-wave sensors.

Figure 2:
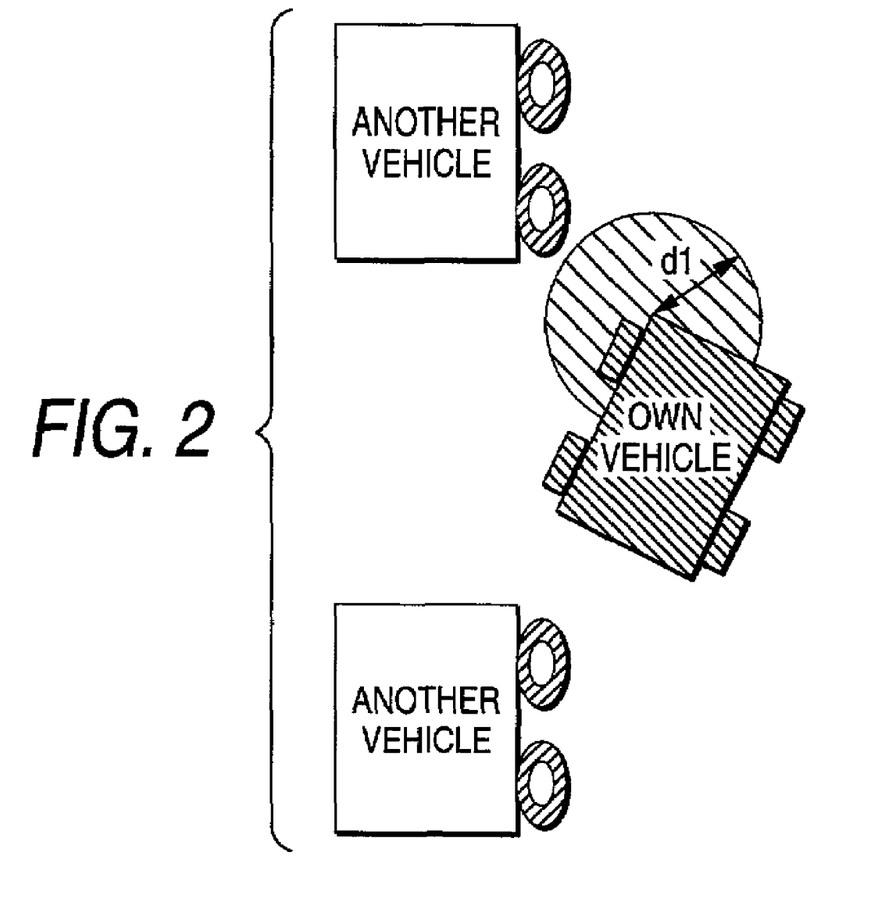
FIG. 2 is a diagram for explaining operation of the driving assistance apparatus according to the first embodiment of the present invention.

As a consequence, the safety are a predicting unit 5 predicts a safety area where an obstacle is not present based upon both the distance "d1" measured by the obstacle sensing unit 4, and the approximate direction. For example, as illustrated in FIG. 2, the safety area predicting unit 5 may set such an area as a safety area where there is substantially no obstacle. This area is defined within a radius "d1" of a circle measured from a sensor position of an ultrasonic-wave sensor.

As indicated in FIG. 2, the safety area superposing unit 6 superposes a synthesized image made by a plurality of cameras 1 on the safety area predicted by the safety area predicting unit 5. The original condition may be understood as follows: That is, with respect to another vehicle which is approached to the own vehicle at the distance "d1" (see FIG. 11A), the safety area superposing unit 6 displays that at least such an area within the (radius) distance of "d1" is safety as illustrated in FIG. 2. As a result, it can be seen that the actual safety area is very narrower than an interval which may be observed from the synthesized image.

As apparent from the above-explained description, the safety area is separately displayed by being superposed on the synthesized image under such a condition that the vehicle driver may make a misunderstanding only by displaying such a synthesized image. As a consequence, the vehicle driver can previously become aware of risky conditions such as vehicle crash (collision) and vehicle contact. Therefore, it is possible to provide such a superior driving assistance apparatus by which the vehicle driver can correctly grasp the peripheral condition and the drive condition of the own vehicle.

(Embodiment 2)

Figure 3:
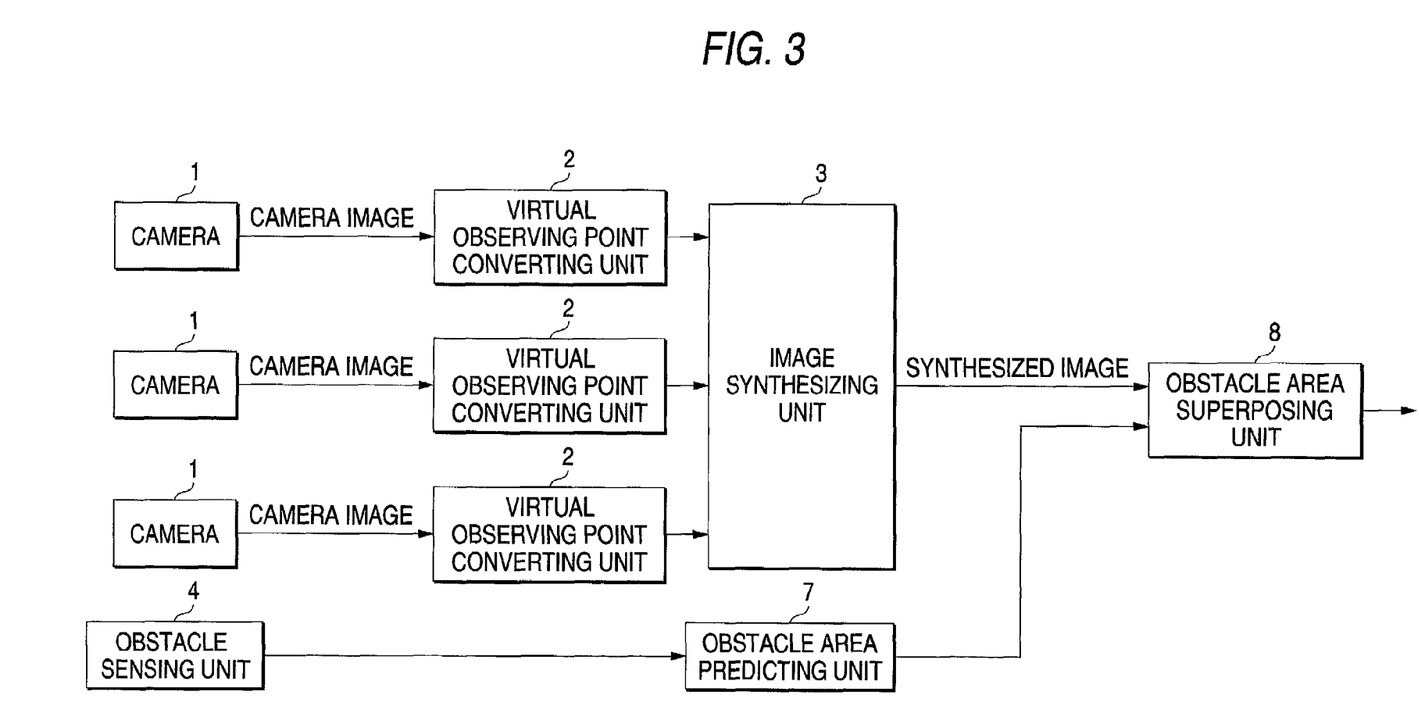
FIG. 3 is a diagram for indicating an arrangement of a driving assistance apparatus according to a second embodiment of the present invention.

FIG. 3 is a schematic block diagram for indicating an arrangement of a driving assistance apparatus according to a second embodiment of the present invention. In FIG. 3, this driving assistance apparatus is arranged by a plurality of cameras 1; a plurality of virtual observing point converting unit 2; image synthesizing unit 3 for synthesizing image information with each other, which is supplied from this virtual observing point converting unit; an obstacle sensing unit 4 such as an ultrasonic-wave sensor, a millimeter-wave radar, and the like; an obstacle area predicting unit 7; and also an obstacle area superposing unit 8.

The arrangement of the driving assistance apparatus according to the second embodiment will now be explained with reference to FIG. 3. Since the operations of this driving assistance apparatus other than the obstacle area predicting unit 7 and the obstacle area superposing unit 8 are similar to those of the above-described first embodiment, explanations thereof are omitted.

The obstacle area predicting unit 7 may predict such an obstacle area in which an obstacle is conceivably present based upon both the distance "d1" and the approximate direction, which are acquired by the obstacle sensing unit 4. In other words, this obstacle area predicting unit 7 may conduct such an area which may be predicted as a risky area based upon a distance longer than the above-described distance "d1." In this case, the obstacle area predicting unit 7 may limit such an area where an obstacle is firmly present, and alternatively may predict such an obstacle area which is grately larger than the above-explained obstacle area. In any cases, this obstacle area predicting unit 7 does not display the safety movable range, but may predict/display such a limited place which is conceivably risky.

Figure 4:
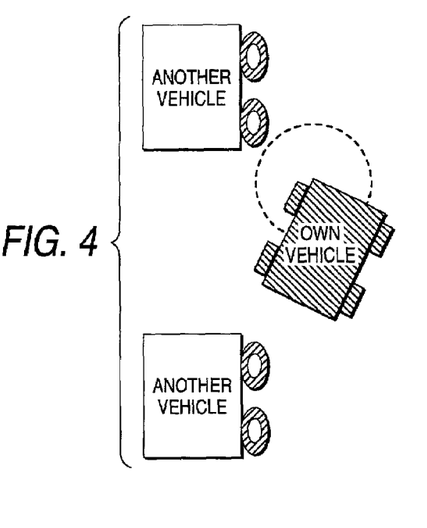
FIG. 4 is a diagram for explaining operation of the driving assistance apparatus according to the second embodiment of the present invention.

For example, the following assumption is made. That is, as shown in FIG. 4, there is a certain possibility that an obstacle is present within an area which is longer than, or equal to the radius "d1" defined from the sensor position of the ultrasonic sensor. Alternatively, this restricted range may be displayed by using a dot line as indicated in FIG. 4. Otherwise, a screen having a light color may be superposed on such an area outside the radius "d1."

The obstacle area superposing unit 8 superposes the image synthesized by the plural sets of cameras 1 on the above-explained area where the obstacle area predicting unit 7 may probably predict presence of the obstacle, and then displays the synthesized image which is superposed with the obstacle-present area.

As apparent from the foregoing description, such an area where the obstacle may be probably present is separately displayed by being superposed on the synthesized image under such a condition that the vehicle driver may make a misunderstanding only by displaying such a synthesized image. As a consequence, the vehicle driver can previously become aware of risky conditions such as vehicle crash (collision) and vehicle contact, while the vehicle driver may directly confirm as to whether or not the obstacle is present. Therefore, it is possible to provide such a superior driving assistance apparatus by which the vehicle driver can correctly grasp the peripheral condition and the drive condition of the own vehicle.

(Embodiment 3)

Figure 5:
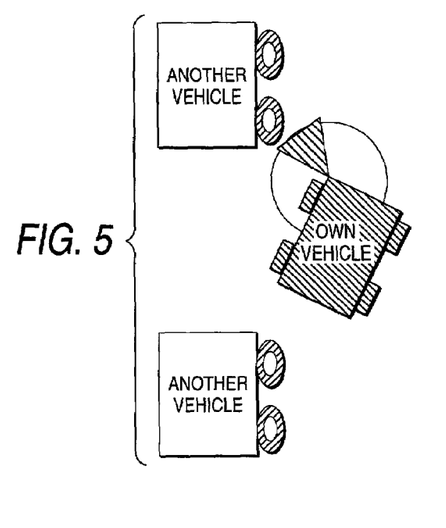
FIG. 5 is a diagram for explaining operation of a driving assistance apparatus according to a third embodiment of the present invention.

FIG. 5 is a diagram for representing operations of a driving assistance apparatus according to a third embodiment of the present invention. It should be understood that an arrangement itself of this driving assistance apparatus according to the third embodiment is basically similar to that of the first embodiment shown in FIG. 1.

Generally speaking, in such a case that the obstacle sensing unit 4 corresponds to such a distance measuring sensor as an ultrasonic sensor capable of measuring a distance up to an obstacle from the own sensing position, and this obstacle sensing unit 4 outputs such a shortest distance from the own vehicle among detected obstacles as a distance measured up to an obstacle, the directivity of this distance measuring sensor is not equal to an omnidirectional characteristic, but this distance measuring sensor may be used, while having a certain directivity.

In other words, in the case that a distance "d1" measured up to an obstacle is detected, an obstacle existing range is not simply determined within a circle having a radius "d1" around the obstacle sensing unit 4 as a center, but may be determined based upon a certain directivity. For example, the obstacle existing range may be limited from such a range within +20 degrees and −20 degrees from a center axis, namely may be restricted from the directivity.

The safety are a predicting unit 5 predicts such a detectable area as a safety area. This detectable area corresponds to either a spherical shape or a circular shape in which a distance measured from this distance measuring sensor up to an obstacle is used as a radius, while a mounting position of the obstacle sensing unit 4 is employed as a center thereof. Further, this detectable safety area is determined based upon the directivity of the obstacle sensing unit 4.

The safety area superposing unit 6 superposes the image synthesized by the plural cameras 1 (see FIG. 1) with the safety area predicted by the safety area predicting unit 5 to display the synthesized image which is superposed with the safety area.

As apparent from the above-explained descriptions, since the distance measured up to the obstacle is displayed with having a certain directivity, it is possible to provide the driving assistance apparatus capable of more firmly predicting the safety area.

(Embodiment 4)

Figure 6:
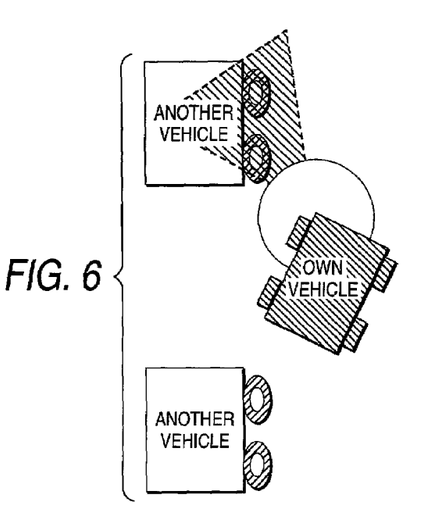
FIG. 6 is a diagram for explaining operation of a driving assistance apparatus according to a fourth embodiment of the present invention.

FIG. 6 is a diagram for representing operations of a driving assistance apparatus according to a fourth embodiment of the present invention. It should be understood that an arrangement itself of this driving assistance apparatus according to the fourth embodiment is basically similar to that of the second embodiment shown in FIG. 3.

A generic feature of the obstacle sensing unit 4 has been explained with reference to the above-explained third embodiment. While the information acquired by this obstacle sensing unit 4 is employed, the obstacle area predicting unit 7 predicts such a portion contained in the detectable area as an obstacle area. This detectable area corresponds to such an area located outside either the spherical shape or the circular shape in which the distance measured from this distance measuring sensor up to the obstacle is used as the radius, while the mounting position of the obstacle sensing unit 4 is employed as a center thereof. Further, this detectable obstacle area is determined based upon the directivity of the obstacle sensing unit 4.

The obstacle area superposing unit 8 superposes the image synthesized by the plural cameras 1 with such an obstacle-existing area predicted by the obstacle area predicting unit 8 to display the synthesized image which is superposed with the safety area.

As apparent from the foregoing explanations, the obstacle area predicting unit 7 predicts as the obstacle area such a portion contained in the detectable area which is determined based upon the directivity of the obstacle sensing unit 4. As a consequence, such a superior driving assistance apparatus can be provided by which the region where the obstacle may be probably present can be directly displayed in the emphasis mode in the more firm manner.

(Embodiment 5)

Figure 7:
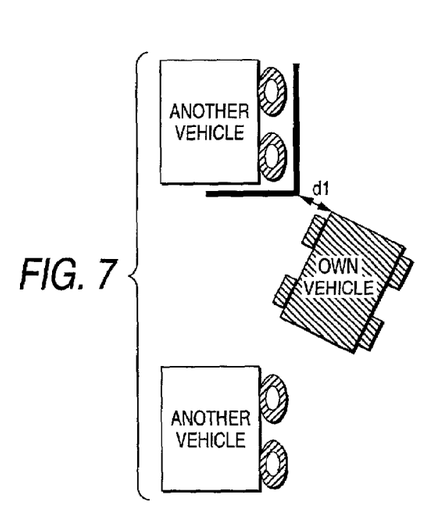
FIG. 7 is a diagram for indicating an arrangement of a driving assistance apparatus according to a fifth embodiment of the present invention.

FIG. 7 is a diagram for representing operations of a driving assistance apparatus according to a fifth embodiment of the present invention. It should be understood that an arrangement itself of this driving assistance apparatus according to the fifth embodiment is basically similar to that of the second embodiment shown in FIG. 3.

In the case that the obstacle sensing unit 4 is assumed as such an obstacle sensing unit which is constructed of either an ultrasonic-wave sensor having a plurality of ultrasonic-wave oscillating sources or an ultrasonic-wave sensor capable of scanning ultrasonic waves by varying a direction, since this ultrasonic-wave sensor can recognize distances measured up to an object along the respective directions, a shape of this obstacle can be substantially grasped to some extent from the above-explained various information.

As a result, the obstacle area predicting unit 7 may also grasp the substantially complete shape of the obstacle which is faced to a side of the own vehicle based upon the information sensed from this obstacle sensing unit 4, and thus, may predict such an area in which the obstacle is present and which contains a dimension of this obstacle.

The obstacle area superposing unit 8 superposes the image synthesized by the plural cameras 1 with such an area where the obstacle may be probably present, which is predicted by the obstacle area predicting unit 7 to display the synthesized image which is superposed with the obstacle-present area.

As apparent from the foregoing descriptions, the obstacle area predicting unit 7 may also grasp the substantially complete shape of the obstacle which is faced to the side of the own vehicle based upon the information acquired from the obstacle sensing unit 4, and may predict the area in which the obstacle is present and which involves the dimension of this obstacle. As a consequence, such a superior driving assistance apparatus can be provided by which the region where the obstacle may be probably present can be directly displayed in the emphasis mode in the more firm manner.

(Embodiment 6)

Figure 8:
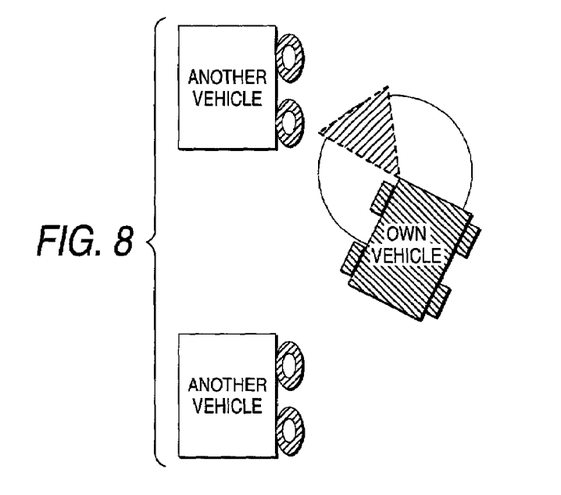
FIG. 8 is a diagram for explaining operation of a driving assistance apparatus according to a sixth embodiment of the present invention.

FIG. 8 is a diagram for representing operations of a driving assistance apparatus according to a sixth embodiment of the present invention. It should be understood that an arrangement itself of this driving assistance apparatus according to the sixth embodiment is basically similar to that of the first embodiment shown in FIG. 1.

Even when a safety area is displayed, if completely color solid painting is continuously displayed, then an image of another vehicle which constitutes a major aspect of this driving assistance apparatus cannot be completely observed. Even when an obstacle is surely deformed, what obstacle is present, or the obstacle owns an easily-grasped surface. As a result, such a display operation that the image of this obstacle is completely deleted is not preferable in view of safety aspect.

As a consequence, the safety area superposing unit 6 superposes the safety area which is predicted by the safety area predicting unit 5 on the image synthesized by the image synthesizing unit 3 in a flickering display manner, a half-tone dot meshing display manner, or a transparent color display manner. Accordingly, while the content of the obstacle can be visibly grasped from the image content of the synthesized image, such a superior driving assistance apparatus can be provided, by which the safety area can be correctly and clearly grasped. It should also be understood that FIG. 8 indicates such an example that while the safety area predicted by the safety area predicting unit 5 is displayed in the half-tone dot meshing display manner, this safety area is superposed on the image synthesized by the image synthesizing unit 3.

(Embodiment 7)

Figure 9A:
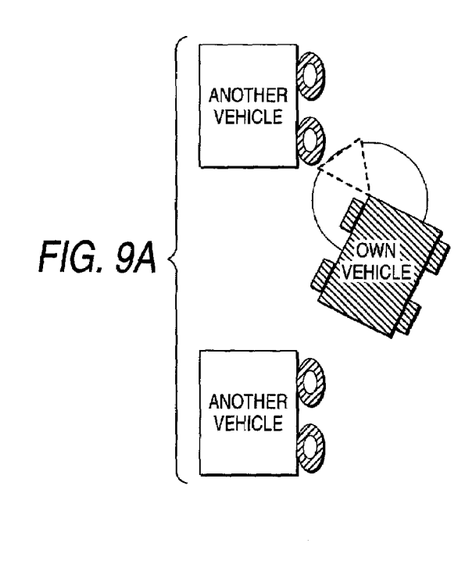
FIGS. 9A and 9B are diagrams for explaining operation of a driving assistance apparatus according to a seventh embodiment of the present invention.
Figure 9B:
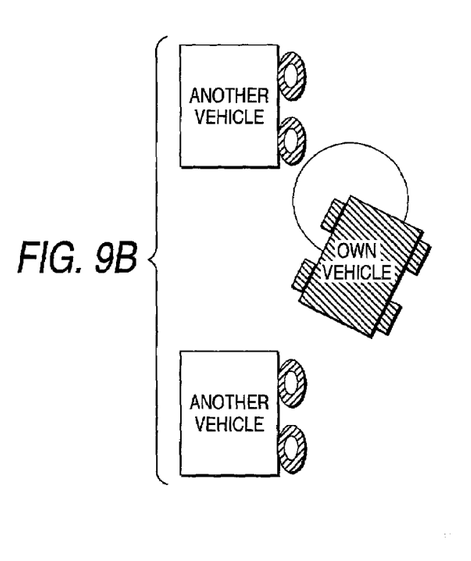

FIGS. 9A and 9B are diagrams for representing operations of a driving assistance apparatus according to a seventh embodiment of the present invention. It should be understood that an arrangement itself of this driving assistance apparatus according to the seventh embodiment is basically similar to that of the second embodiment shown in FIG. 3.

The driving assistance apparatus according to this seventh embodiment of the present invention may be realized based upon the inventive idea as that of the driving assistance apparatus according to the sixth embodiment. That is to say, even when an obstacle area is displayed, if completely color solid painting is continuously displayed, then an image of another vehicle which constitutes a major aspect of this driving assistance apparatus cannot be completely observed. Even when an obstacle is surely deformed, what obstacle is present, or the obstacle owns an easily-grasped surface. As a result, such a display operation that the image of this obstacle is completely deleted is not preferable in view of safety aspect.

As a consequence, the obstacle area superposing unit 8 superposes the obstacle area which is predicted by the obstacle area predicting unit 7 on the image synthesized by the image synthesizing unit 3 in a flickering display manner, a half-tone dot meshing display manner, or a transparent color display manner. Accordingly, while the content of the obstacle can be visibly grasped from the image content of the synthesized image, such a superior driving assistance apparatus can be provided, by which the safety area can be correctly and clearly grasped. It should also be understood that FIG. 9A indicates such an example that while the obstacle area predicted by the obstacle area predicting unit 7 is displayed in the flickering display manner, this obstacle area is superposed on the image synthesized by the image synthesizing unit 3. Furthermore, it should be noted that FIG. 9B indicates such an example that while the obstacle are a predicted by the obstacle area predicting unit 7 is displayed in the transparent color display manner, this obstacle area is superposed on the image synthesized by the image synthesizing unit 3.

As previously described in detail, the driving assistance apparatus according to the present invention can achieve the following effects. That is, while the distance measuring sensor such as the ultrasonic-wave sensor is employed in addition to the cameras, the information obtained from the distance measuring sensor is effectively superposed on the synthesized image to display the synthesized image which is superposed with the distance measuring information. As a consequence, the safety and easily-grasped image display can be made.

What is claimed is:

1. A driving assistance apparatus for displaying and guiding a peripheral condition of a vehicle in an easily understanding manner, comprising:

a camera mounted on a peripheral portion of the vehicle;

an virtual observing point converting unit which converts an image picked up by the camera into an image viewed from a virtual observing point;

an image synthesizing unit which synthesizes the images viewed from a virtual observing point to display a peripheral condition of the vehicle;

an obstacle sensing unit which senses presence of an obstacle and which measures at least one of a distance from the own vehicle up to an obstacle and a direction of the obstacle; and a safety area predicting unit which predicts a safety area of the peripheral portion of the own vehicle, in which the obstacle is not present, based upon the information acquired by the obstacle sensing unit.

2. The driving assistance apparatus as claimed in claim 1, further comprising:

a safety area superposing unit which superposes the safety area on the image synthesized by the image synthesizing unit for display the superposed area.

3. The driving assistance apparatus as claimed in claim 2, wherein the safety area superposing unit superposes the safety area predicted by the safety area predicting unit on the image synthesized by the image synthesizing unit in at least one of a flickering display manner, a half-tone dot meshing display manner, and a transparent color display manner.

4. A driving assistance apparatus for displaying and guiding a peripheral condition of a vehicle in an easily understanding manner, comprising:

a camera mounted on a peripheral portion of the vehicle;

a virtual observing point converting unit which converts an image picked up by the camera into an image viewed from a virtual observing point;

an image synthesizing unit which synthesizes the images viewed from a virtual observing point to display a peripheral condition of the vehicle;

an obstacle sensing unit which senses presence of an obstacle and which measures at least one of a distance from the own vehicle up to an obstacle and a direction of the obstacle;

an obstacle area predicting unit for predicting an obstacle area; and an obstacle area superposing unit which superposes the obstacle area on the image synthesized by the image synthesizing unit for display the superposed area.

5. The driving assistance apparatus as claimed in claim 4, wherein the obstacle area superposing unit superposes the obstacle area predicted by the obstacle area predicting unit on the image synthesized by the image synthesizing unit in at least one of a flickering display manner, a half-tone dot meshing display manner, and transparent color display manner.

6. A driving assistance apparatus for displaying and guiding a peripheral condition of a vehicle in an easily understanding manner, comprising:

a camera mounted on a peripheral portion of the vehicle;

an virtual observing point converting unit which converts an image picked up by the camera into an image viewed from a virtual observing point;

an image synthesizing unit which synthesizes the images viewed from a virtual observing point to display a peripheral condition of the vehicle;

an obstacle sensing unit which senses presence of an obstacle and which measures at least one of a distance from the own vehicle up to an obstacle and a direction of the obstacle; and a safety area predicting unit which predicts a safety area of the peripheral portion of the own vehicle, in which the obstacle is not present, based upon the information acquired by the obstacle sensing unit;

wherein the obstacle sensing unit corresponds includes a distance measuring sensor capable of measuring a distance from the own sensor up to the obstacle, and outputs the shortest distance from the own vehicle among the detected obstacles as the distance up to the obstacle, wherein the safety area predicting unit predicts a safety area corresponding to an area is detectable by the distance measuring sensor and the area is located within one of a sphere and a circle where the distance up to the obstacle is defined as a radius, while a mounting position of the distance measuring sensor is used as a center of the sphere or the circle.

7. A driving assistance apparatus for displaying and guiding a peripheral condition of a vehicle in an easily understanding manner, comprising:

a camera mounted on a peripheral portion of the vehicle;

an virtual observing point converting unit which converts an image picked up by the camera into an image viewed from a virtual observing point;

an image synthesizing unit which synthesizes the images viewed from a virtual observing point to display a peripheral condition of the vehicle;

a first obstacle sensing unit for measuring a distance from the own vehicle up to an obstacle and a direction of the obstacle, and also for sensing presence of the obstacle by way of a sensor;

a second obstacle sensing unit which senses presence of an obstacle and which measures at least one of a distance from the own vehicle up to an obstacle and a direction of the obstacle;

an obstacle area predicting unit for predicting an obstacle area; and an obstacle area superposing unit which superposes the obstacle area on the image synthesized by the image synthesizing unit for display the superposed area;

wherein the first and second obstacle sensing units include an ultrasonic-wave sensor capable of measuring a distance from the own sensor up to the obstacle, and outputs the shortest distance from the own vehicle among the detected obstacles as the distance up to the obstacle; and wherein the obstacle area predicting unit predicts an area where an obstacle is present, that corresponds to an area detectable by the ultrasonic-wave sensor, and the area located outside one of a sphere and a circle where the distance up to the obstacle is defined as a radius, while a mounting position of the ultrasonic-wave sensor is used as a center of the sphere or circle.

8. A driving assistance apparatus for displaying and guiding a peripheral condition of a vehicle in an easily understanding manner, comprising:

a camera mounted on a peripheral portion of the vehicle;

an virtual observing point converting unit which converts an image picked up by the camera into an image viewed from a virtual observing point;

an image synthesizing unit which synthesizes the images viewed from a virtual observing point to display a peripheral condition of the vehicle;

a first obstacle sensing unit for measuring a distance from the own vehicle up to an obstacle and a direction of the obstacle, and also for sensing presence of the obstacle by way of a sensor;

a second obstacle sensing unit which senses presence of an obstacle and which measures at least one of a distance from the own vehicle up to an obstacle and a direction of the obstacle;

an obstacle area predicting unit for predicting an obstacle area; and an obstacle area superposing unit which superposes the obstacle area on the image synthesized by the image synthesizing unit for display the superposed area;

wherein the first and second obstacle sensing units include one of an ultrasonic-wave sensor having a plurality of ultrasonic-wave oscillating sources and an ultrasonic-wave sensor capable of varying a direction of the scanning operation, wherein the obstacle area predicting unit grasps a substantially shape of the obstacle which is faced to a side of the own vehicle based upon the information derived from the first and second obstacle sensing units, and predicts the area where the obstacle is present, which involving a dimension of the obstacle.

* * * * *